D. R. PORTER.
BITLESS GUIDING BRIDLE.
APPLICATION FILED APR. 19, 1911.
1,008,365.
Patented Nov. 14, 1911.
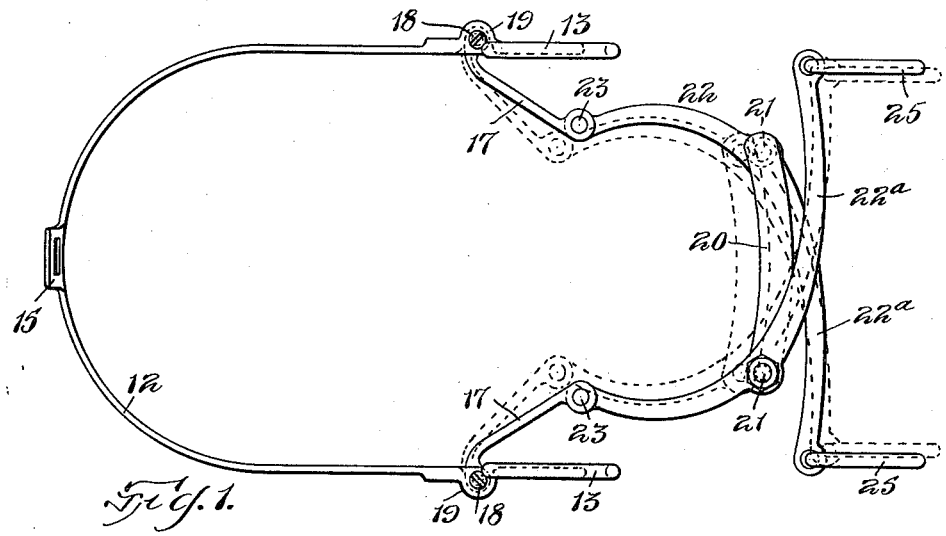
Fig. 1.
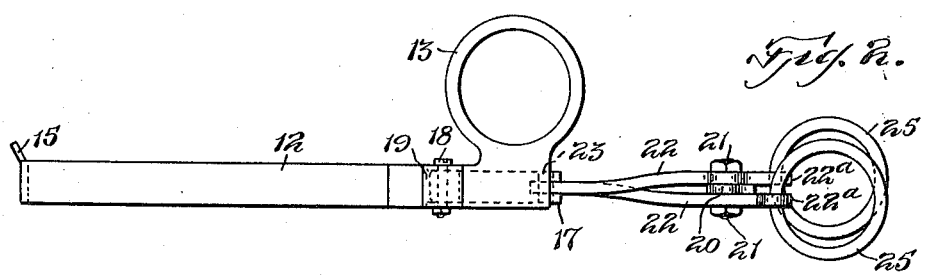
Fig. 2.
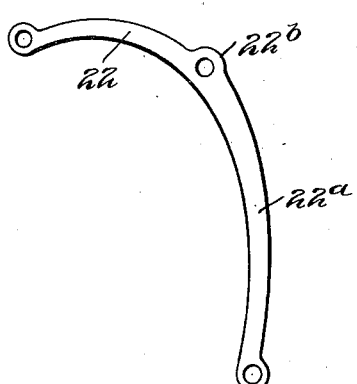
Fig. 4.
Fig. 3.
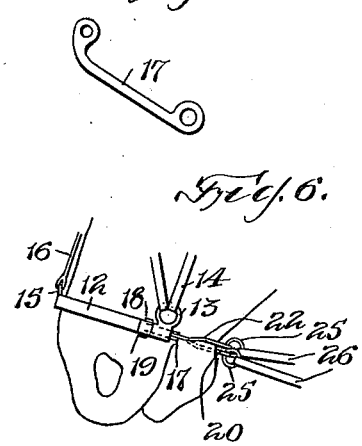
Fig. 6.
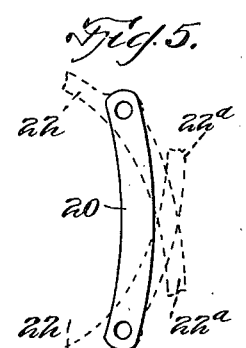
Fig. 5.
Witnesses:
Harry L. Allen
E. Batchelder
Inventor:
D. R. Porter

UNITED STATES PATENT OFFICE.

DANIEL R. PORTER, OF EVERETT, MASSACHUSETTS, ASSIGNOR TO ARCHIBALD GATES PORTER, OF REVERE, MASSACHUSETTS.

BITLESS GUIDING-BRIDLE.

1,008,365.        Specification of Letters Patent.     Patented Nov. 14, 1911.

Application filed April 19, 1911. Serial No. 622,055.

*To all whom it may concern:*

Be it known that I, DANIEL R. PORTER, of Everett, in the county of Middlesex and State of Massachusetts, have invented certain new and useful Improvements in Bitless Guiding-Bridles, of which the following is a specification.

This invention relates to bitless bridles adapted to humanely control and guide refractory or hard-mouthed horses, and it consists in the improvements which I will now proceed to describe and claim.

Of the accompanying drawings forming a part of this specification,—Figure 1 represents a top plan view of the chief portions of a bridle embodying my invention. Fig. 2 represents a side or edge view of the same. Figs. 3, 4 and 5 represent views of parts of the bridle detached. Fig. 6 represents a side view on a smaller scale showing the bridle in place on the horse's head.

The same reference characters indicate the same or similar parts in all the figures.

In the drawings,—12 represents a U-shaped nose loop, composed of substantially parallel side portions and a curved connecting neck, the neck being adapted to bear on the frontal bone of a horse's head above the nostrils, and the side portions being formed to extend rearwardly along the sides of the head and terminating substantially at the corners of the horse's mouth. The loop 12 is provided with suitable means for engaging the usual supporting straps forming parts of a complete bridle, the means here shown comprising rings 13 formed on or rigidly attached to the rear ends of the side portions of the loop and adapted to engage side straps 14, and a slotted ear 15 formed on the neck portion of the loop and adapted to engage a front strap 16.

17 17 represent pressure members which are elongated bars, connected at their forward ends by pivot bolts 18 with the rear end portions of the sides of the loop 12, said portions being provided with sockets 19 which receive said bolts. The pressure members 17 extend rearwardly from the bolts 18 and their rear ends are adapted to swing inwardly to exert pressure against the sides of the head of the animal.

20 represents a transversely extending fulcrum bar which is located at a distance from the rear ends of the pressure members 17 and extends crosswise of the space between said members, said fulcrum bar being arranged to bear on the rear side of the under jaw.

On the ends of the fulcrum bar 20 are fulcrumed by pivot bolts 21 two levers, each having a shorter front arm 22 and a longer rear arm $22^a$, each lever having an ear $22^b$ which receives the pivot bolt 21 connecting it to the fulcrum bar 20. The front arms 22 of the levers are pivoted at 23 to the rear ends of the pressure members 17. The rear arms $22^a$ extend in different directions from the front arms 22, said arms $22^a$ extending laterally and crossing each other as shown by Fig. 1. The outer ends of the arms $22^a$ are provided with means such as rings 25 for engaging driving reins 26. One of the levers bears on the upper side of the fulcrum bar 20 and the other lever on the under side of the same, as indicated by Fig. 2. It will be seen by reference to Fig. 1, that a backward pull exerted on the outer end of the longer arm $22^a$ of either lever will swing the shorter arm 22 and the rear end of the pressure member 17 inwardly, thus increasing the pressure of said member on the lower jaw. When the pull is exerted on only one of the levers, only the pressure member 17 connected therewith will be pressed inwardly, thus imparting a guiding pressure to one side of the lower jaw, provision being thus made for guiding the horse either to the right or to the left. When both levers are pulled simultaneously, the two pressure members are simultaneously pressed inward as indicated by dotted lines in Fig. 1, the fulcrum bar 20 being at the same time pressed forward against the rear side of the under jaw. A powerful and yet not injurious controlling pressure is thus exerted on the under jaw, the control thus exerted being adapted to restrain a refractory or hard-mouthed horse.

The parts above described are made of suitable metal, the parts which come in contact with the animal's head being preferably covered or padded with leather to prevent injury to the skin by the pressure exerted on it. For the sake of simplicity and clearness of the drawings, I have not illustrated the leather coverings.

I claim:—

A bridle comprising a nose loop formed to bear on the frontal bone of a horse's head and extend backwardly therefrom at opposite sides of the head above the nostrils, said loop having means for engagement with supporting straps, pressure members pivoted to the rear end portions of the said loop and extending rearwardly therefrom, the rear ends of said members being adapted to swing inwardly against the sides of the head, a transversely extending fulcrum bar located behind the pressure members, and levers pivoted between their ends to the end portions of the fulcrum bar, and having front shorter arms pivoted to the swinging ends of the pressure members and rear longer arms extending laterally from the fulcrum pivots which connect the levers to the fulcrum bar, said longer arms crossing each other and having rein-engaging means at their outer ends.

In testimony whereof I have affixed my signature, in presence of two witnesses.

DANIEL R. PORTER.

Witnesses:
C. F. BROWN,
P. W. PEZZETTI.

Copies of this patent may be obtained for five cents each, by addressing the "Commissioner of Patents, Washington, D. C."